US012046839B2

(12) United States Patent
Wang et al.

(10) Patent No.: US 12,046,839 B2
(45) Date of Patent: Jul. 23, 2024

(54) ANTENNA STRUCTURE AND ELECTRONIC DEVICE

(71) Applicants: Beijing BOE Technology Development Co., Ltd., Beijing (CN); BOE Technology Group Co., Ltd., Beijing (CN)

(72) Inventors: Yali Wang, Beijing (CN); Feng Qu, Beijing (CN); Biqi Li, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 270 days.

(21) Appl. No.: 17/629,417

(22) PCT Filed: Apr. 12, 2021

(86) PCT No.: PCT/CN2021/086406
§ 371 (c)(1),
(2) Date: Jan. 24, 2022

(87) PCT Pub. No.: WO2022/217400
PCT Pub. Date: Oct. 20, 2022

(65) Prior Publication Data
US 2023/0318185 A1 Oct. 5, 2023

(51) Int. Cl.
*H01Q 1/22* (2006.01)
*H01Q 1/48* (2006.01)
(Continued)

(52) U.S. Cl.
CPC ............. *H01Q 9/0421* (2013.01); *H01Q 1/22* (2013.01); *H01Q 1/48* (2013.01); *H01Q 1/50* (2013.01); *H01Q 9/04* (2013.01)

(58) Field of Classification Search
CPC .......... H01Q 9/0421; H01Q 1/48; H01Q 1/50; H01Q 1/22; H01Q 5/364
See application file for complete search history.

(56) References Cited

U.S. PATENT DOCUMENTS 6,292,141 B1 * 9/2001 Lim ......................... H01Q 5/40 343/873
6,344,833 B1 * 2/2002 Lin ........................ H01Q 21/28 343/873

(Continued)

FOREIGN PATENT DOCUMENTS

CN 106058450 A 10/2016
CN 109449582 A 3/2019

(Continued)

*Primary Examiner* — Hai V Tran

(74) *Attorney, Agent, or Firm* — Ling Wu; Stephen Yang; Ling and Yang Intellectual Property

(57) ABSTRACT

An antenna structure includes a dielectric substrate, a ground layer and a radiation layer located at two opposite sides of the dielectric substrate. The ground layer has two first gaps which are symmetrical about a central axis of the antenna structure in a first direction to introduce a radiation zero. The radiation layer has two second gaps which are symmetrical about the central axis, edges of the two second gaps are aligned with edges of the radiation layer in a second direction to introduce another radiation zero. The second direction is perpendicular to the first direction.

10 Claims, 10 Drawing Sheets

(51) Int. Cl.
*H01Q 1/50* (2006.01)
*H01Q 9/04* (2006.01)

(56) References Cited

U.S. PATENT DOCUMENTS

| | | | | |
|---|---|---|---|---|
| 8,581,801 | B2 * | 11/2013 | Puzella | H01P 5/10 343/878 |
| 11,271,319 | B2 * | 3/2022 | Celik | H01Q 1/38 |
| 2008/0204326 | A1 * | 8/2008 | Zeinolabedin Rafi | H01Q 9/0428 343/700 MS |
| 2014/0097995 | A1 * | 4/2014 | McKinzie, III | H01Q 21/26 29/601 |

FOREIGN PATENT DOCUMENTS

| | | | |
|---|---|---|---|
| CN | 109802225 | A | 5/2019 |
| CN | 111293413 | A | 6/2020 |

* cited by examiner

ANTENNA STRUCTURE AND ELECTRONIC DEVICE

CROSS-REFERENCE TO RELATED APPLICATIONS

The present application is a U.S. National Phase Entry of International Application No. PCT/CN2021/086406 having an international filing date of Apr. 12, 2021. The above-identified application is hereby incorporated by reference.

TECHNICAL FIELD

The present disclosure relates to, but is not limited to, the technical field of communication, in particular to an antenna structure and an electronic device.

BACKGROUND

An antenna is an important part of mobile communication, and its research and design play a vital role in the mobile communication. A biggest change brought about by the fifth-generation mobile communication technology (5G) is the innovation of user experience. The quality of signal in a terminal device directly affects the user experience. Therefore, the design of a 5G terminal antenna will become one of the important part of 5G deployment.

SUMMARY

The following is a summary about the subject matter described in the present disclosure in detail. The summary is not intended to limit the scope of protection of the claims.

Embodiments of the present disclosure provide an antenna structure and an electronic device.

In an aspect, an embodiment of the present disclosure provides an antenna structure, which includes a dielectric substrate, a ground layer and a radiation layer located at two opposite sides of the dielectric substrate. The ground layer has two first gaps which are symmetrical about a central axis of the antenna structure in a first direction to introduce a radiation zero. The radiation layer has two second gaps which are symmetrical about the central axis, edges of the two second gaps are aligned with edges of the radiation layer in a second direction to introduce another radiation zero; and the second direction is perpendicular to the first direction.

In some exemplary implementations, orthographic projections of the second gaps on the dielectric substrate are located at a side of orthographic projections of the first gaps on the dielectric substrate close to the central axis.

In some exemplary implementations, the two first gaps and the two second gaps extend along the second direction, and a length of the first gaps along the second direction is longer than a length of the second gaps along the second direction.

In some exemplary implementations, the antenna structure further includes at least one first short-circuit post and at least one second short-circuit post, wherein the first short-circuit post and the second short-circuit post connect the ground layer and the radiation layer. The first short-circuit post and the second short-circuit post are symmetrical about the central axis. Orthographic projections of the first short-circuit post and the second short-circuit post on the dielectric substrate are located at a side of the orthographic projections of the first gaps on the dielectric substrate away from the central axis.

In some exemplary implementations, the quantity of the first short-circuit post and the quantity of the second short-circuit post are both three.

In some exemplary implementations, the ground layer is connected with an outer conductor of a coaxial conductive post, and the radiation layer is connected with an inner conductor of the coaxial conductive post. An orthographic projection of the coaxial conductive post on the dielectric substrate is located between the orthographic projections of the two second gaps on the dielectric substrate.

In some exemplary implementations, the coaxial conductive post is connected with a radio frequency connector, and the radio frequency connector is located at a side of the ground layer away from the dielectric substrate.

In some exemplary implementations, in the second direction, first ends of the two second gaps communicate with each other and are flush with the edges of the radiation layer.

In some exemplary implementations, in the second direction, the first ends of the two second gaps communicate with each other and are flush with the edges of the radiation layer, and second ends of the two second gaps also communicate with each other and are flush with the edges of the radiation layer; the first ends and the second ends are located at two opposite sides of the central axis of the antenna structure in the second direction.

In another aspect, an embodiment of the present disclosure provides an electronic device including the antenna structure as described above.

After reading and understanding the drawings and the detailed description, other aspects may be understood.

BRIEF DESCRIPTION OF DRAWINGS

The drawings provide a further understanding to the technical solution of the present disclosure, form a part of the specification, and are used to explain, together with the embodiments of the present disclosure, the technical solutions of the present disclosure and not intended to form limits to the technical solutions of the present disclosure. The shapes and sizes of one or more components in the drawings do not reflect the true scale, and are only intended to schematically describe the contents of the present disclosure.

DETAILED DESCRIPTION

Figure 1A:
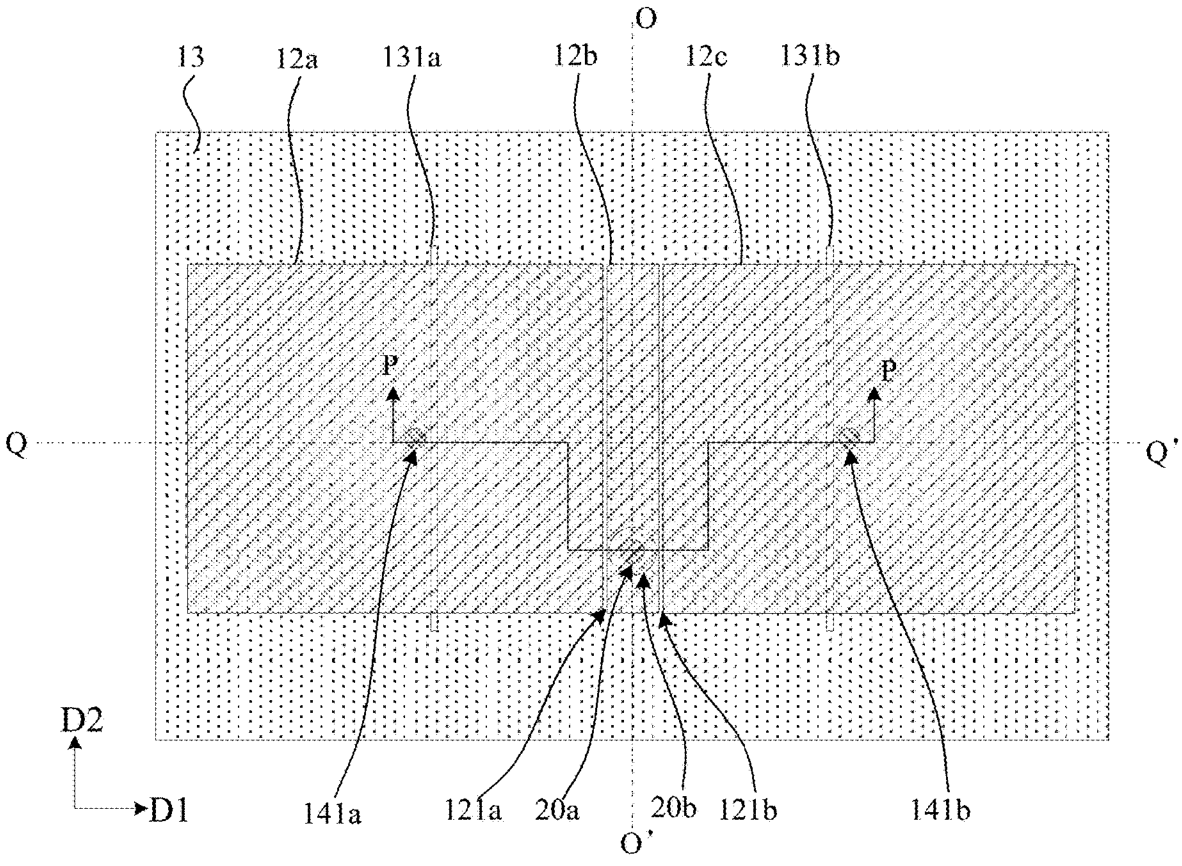
FIG. 1A is a schematic plan view of an antenna structure according to at least one embodiment of the present disclosure.

The embodiments of the present disclosure will be described below in combination with the drawings in detail. The implementation modes may be implemented in various forms. Those of ordinary skill in the art can easily understand such a fact that manners and contents may be transformed into one or more forms without departing from the purpose and scope of the present disclosure. Therefore, the present disclosure should not be explained as being limited to the contents recorded in the following implementations only. The embodiments in the present disclosure and the features in the embodiments can be freely combined if there are no conflicts.

In the drawings, the size/sizes of one or more composition elements, the thicknesses of layers, or regions are exaggerated sometimes for clarity. Therefore, an embodiment of the present disclosure is not necessarily limited to the size, and shapes and sizes of multiple components in the drawings do not reflect real scales. In addition, the drawings schematically illustrate ideal examples, and a mode of the present disclosure is not limited to the shapes, numerical values, or the like shown in the drawings.

Ordinal numerals "first", "second", and "third" in the present disclosure are set not to form limits in number but only to avoid the confusion of composition elements. In the present disclosure, "multiple/plurality" means two or more in quantity.

In the present disclosure, for convenience, expressions "central", "above", "below", "front", "back", "vertical", "horizontal", "top", "bottom", "inside", "outside", etc., indicating orientation or positional relationships are used to illustrate positional relationships between the composition elements referring the drawings, not to indicate or imply that involved devices or elements are required to have specific orientations and be structured and operated with the specific orientations but only to easily and simply describe the present specification, and thus should not be understood as limits to the present disclosure. The positional relationships between the composition elements may be changed as appropriate according to the direction where the composition elements are described. Therefore, appropriate replacements based on situations are allowed, not limited to the expressions in the specification.

In the present disclosure, unless otherwise specified and defined, terms "mounting", "mutual connection", and "connection" should be generally understood. For example, it may be fixed connection, removable connection, or integrated connection; it may be mechanical connection or electrical connection; it may be direct connection, indirect connection through an intermediate component, or communication inside two components. For those skilled in the art, the meanings of the above terms in the present disclosure may be understood according to the situation.

In the present disclosure, an "electrical connection" includes a case where composition elements are connected via an element having a certain electrical action. "The element with the certain electric action" is not particularly limited as long as electric signals between the connected composition elements may be transmitted. Examples of "the element with the certain electric action" not only include an electrode and a line, but also include a switch element such as a transistor, a resistor, an inductor, a capacitor, another element with one or more functions, etc.

In the present disclosure, "parallel" refers to a state that an angle formed by two straight lines is larger than −10° and smaller than 10°, and thus may include a state that the angle is larger than −5° and smaller than 5°. In addition, "perpendicular" refers to a state that an angle formed by two straight lines is larger than 80° and smaller than 100°, and thus may include a state that the angle is larger than 85° and smaller than 95°.

In the present disclosure, "about" refers to that a boundary is defined not so strictly and numerical values in process and measurement error ranges are allowed.

At least one embodiment of the present disclosure provides an antenna structure, which includes a dielectric substrate, radiation layer (such as a radiation patch) and a ground layer located at two opposite sides of the dielectric substrate. The ground layer has two first gaps which are symmetrical about a central axis of the antenna structure in a first direction to introduce a radiation zero. The radiation layer has two second gaps which are symmetrical about the central axis, edges of the two second gaps are aligned with edges of the radiation layer in a second direction to introduce another radiation zero. The second direction is perpendicular to the first direction.

In this embodiment, two symmetrical first gaps are introduced in the ground layer, to introduce a radiation zero at high frequency, and two symmetrical second gaps are introduced at a radiation patch, to introduce a radiation zero at low frequency, so that the radiation zeros are introduced at left and right sides of a resonant frequency point of the antenna respectively to achieve a filtering characteristic. The antenna structure of this embodiment may be applied to the 5G frequency band, and the film structure of the antenna structure is simple and has a low profile, so that a filtering function may be achieved without introducing additional discrete devices and a large insertion loss may be avoided.

In some exemplary implementations, orthographic projections of the second gaps on the dielectric substrate are located at a side of orthographic projections of the first gaps on the dielectric substrate close to the central axis.

In some exemplary implementations, two first gaps and two second gaps extend along the second direction, and a length of the first gaps along the second direction is greater than a length of the second gaps along the second direction.

In some exemplary implementation, the antenna structure further includes at least one first short-circuit post and at least one second short-circuit post. The first short-circuit post and the second short-circuit post connect the ground layer and the radiation layer. The first short-circuit post and the second short-circuit post are symmetrical about the central axis. Orthographic projection of the first short-circuit post and the second short-circuit post on the dielectric substrate are located at a side of the orthographic projections of the first gaps on the dielectric substrate away from the central axis. In this exemplary implementation, an out-of-band suppression characteristic of a gain passband may be improved by introducing the symmetrical first short-circuit post and second short-circuit post.

In some exemplary implementations, the quantity of the first short-circuit posts and the quantity of the second short-circuit posts are both three. However, this embodiment is not limited thereto.

In some exemplary implementations, the ground layer is connected with an outer conductor of a coaxial conductive post, and the radiation layer is connected with an inner conductor of the coaxial conductive post. An orthographic projection of the coaxial conductive post on the dielectric substrate is located between the orthographic projections of the two second gaps on the dielectric substrate. In this example, the radiation layer is fed by a coaxial feeding manner.

In some exemplary implementations, the coaxial conductive post is connected with a radio frequency connector (SMA), which is located at a side of the ground layer away from the dielectric substrate. The SMA is used to connect external radio frequency signals.

In some exemplary implementations, in the second direction, first ends of the two second gaps communicate with each other and are flush with the edges of the radiation layer. For example, the two second gaps are strip-shaped, and the two second gaps after communicating with each other may be Y-shaped. However, this embodiment is not limited thereto.

In some exemplary embodiments, in the second direction, the first ends of the two second gaps communicate with each other and are flush with the edges of the radiation layer, and second ends of the two second gaps also communicate with each other and are flush with the edges of the radiation layer. The first ends and the second ends are located at two opposite sides of the central axis of the antenna structure in the second direction. However, this embodiment is not limited thereto.

The antenna according to this embodiment will be illustrated below through a number of examples.

Figure 1B:
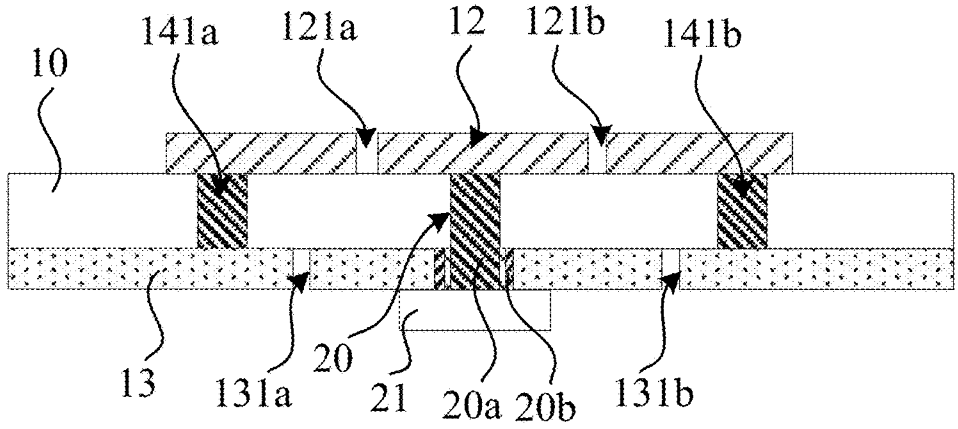
FIG. 1B is a schematic partial sectional view of an antenna structure shown in FIG. 1A along a P-P direction.

FIG. 1A is a schematic plan view of an antenna structure according to at least one embodiment of the present disclosure. FIG. 1B is a schematic partial sectional view of an antenna structure shown in FIG. 1A along a P-P direction. In some exemplary implementations, as shown in FIG. 1A and FIG. 1B, the antenna structure of this exemplary embodiment includes a dielectric substrate 10, a radiation layer 12 and a ground layer 13 located at two opposite sides of the dielectric substrate 10. The ground layer 13 has two first gaps 131*a* and 131*b*. The two first gaps 131*a* and 131*b* are symmetrical about a central axis OO' of the antenna structure in a first direction D1. The two first gaps 131*a* and 131*b* both extend along a second direction D2. The first direction D1 is perpendicular to the second direction D2. A length of the first gaps 131*a* and 131*b* along the second direction D2 is smaller than a length of the ground layer 13 along the second direction D2. Orthographic projections of the first gaps 131*a* and 131*b* on the dielectric substrate 10 may both be rectangular. However, this embodiment is not limited thereto.

In some exemplary implementations, as shown in FIG. 1A and FIG. 1B, the radiation layer 12 has two second gaps 121*a* and 121*b*, which are symmetrical about the central axis OO', and edges of the two second gaps 121*a* and 121*b* are aligned with edges of the radiation layer 12 in the second direction D2. The two second gaps 121*a* and 121*b* both extend along the second direction D2. A length of the second gap 121*a* in the second direction D2 is smaller than a length of the first gap 131*a* in the second direction D2. The length of the second gap 121*a* in the second direction D2 is approximately equal to a length of the radiation layer 12 in the second direction D2. Orthographic projections of the second gaps 121*a* and 121*b* on the dielectric substrate 10 may both be rectangular. However, this embodiment is not limited thereto.

In some exemplary embodiments, as shown in FIG. 1A, two second gaps 121*a* and 121*b* divide the radiation layer 12 into a first radiation part 12*a*, a second radiation part 12*b* and a third radiation part 12*c*, the second gap 121*a* is between the first radiation part 12*a* and the second radiation part 12*b* and the second gap 121*b* is between the second radiation part 12*b* and the third radiation part 12*c*. In this example, the first radiation part 12*a*, the second radiation part 12*b* and the third radiation part 12*c* may all be rectangular. However, this embodiment is not limited thereto.

In some exemplary implementations, as shown in FIG. 1A, the orthographic projection of the second gap 121*a* on the dielectric substrate 10 is located at a side of the orthographic projection of the first gap 131*a* on the dielectric substrate 10 close to the central axis OO', and the orthographic projection of the second gap 121*b* on the dielectric substrate 10 is located at a side of the orthographic projection of the first gap 131*b* on the dielectric substrate 10 close to the central axis OO'.

In this exemplary implementation, two first gaps 131*a* and 131*b* symmetrical about the central axis OO' may be introduced into the ground layer 13, so as to introduce a radiation zero at high frequency; and two second gaps 121*a* and 121*b* symmetrical about the central axis OO' may be introduced into the radiation layer 12, so as to introduce a radiation zero at low frequency, thus achieving the filtering characteristic of the antenna.

In some exemplary implementations, as shown in FIG. 1A and FIG. 1B, the first radiation part 12*a* of the radiation layer 12 is connected with the ground layer 13 through a first short-circuit post 141*a*, and the third radiation part 12*c* is connected with the ground layer 13 through a second short-circuit post 141*b*. Orthographic projections of the first short-circuit post 141*a* and the second short-circuit post 141*b* on the dielectric substrate 10 may be circular. However, this embodiment is not limited thereto.

In some examples, an orthographic projection of the first short-circuit post 141*a* on the dielectric substrate 10 is located at a side of the orthographic projection of the first gap 131*a* on the dielectric substrate 10 away from the central axis OO', and an orthographic projection of the second short-circuit post 141*b* on the dielectric substrate 10 is located at a side of the orthographic projection of the first gap 131*b* on the dielectric substrate 10 away from the central axis OO'. The first short-circuit post 141*a* and the second short-circuit post 141*b* are symmetrical about the central axis OO'. The first short-circuit post 141*a* is adjacent to the first gap 131*a*, and the second short-circuit post 141*b* is adjacent to the second gap 131*b*. In this exemplary implementation, an out-of-band suppression characteristic of passband may be improved by introducing two symmetrical short-circuit posts outside the first gaps.

In some exemplary implementations, as shown in FIG. 1A, the antenna structure has the central axis QQ' in the second direction D2. The radiation layer 12 is symmetrical about the central axis QQ', the ground layer 13 is symmetrical about the central axis QQ', and the first short-circuit post

141*a* and the second short-circuit post 141*b* may be located at the central axis QQ'. However, this embodiment is not limited thereto.

In some exemplary implementations, as shown in FIG. 1A and FIG. 1B, the second radiation part 12*b* of the radiation layer 12 is connected with an inner conductor 20*a* of a coaxial conductive post 20, and the ground layer 13 is connected with an outer conductor 20*b* of the coaxial conductive post 20. An insulating layer is disposed between the inner conductor 20*a* and the outer conductor 20*b* of the coaxial conductive post 20. Orthogonal projections of the inner conductor 20*a* and the outer conductor 20*b* on the dielectric substrate 10 may be concentric circles, and a radius of the orthogonal projection of the outer conductor 20*b* is larger than a radius of the orthogonal projection of the inner conductor 20*a*. The coaxial conductive post 20 is also connected with a radio frequency connector 21, which is configured to connect external radio frequency signals. The radio frequency connector 21 may be located at a side of the ground layer 13 away from the dielectric substrate 10. The outer conductor 20*b* of the coaxial conductive post 20 passes through the ground layer 13 from a side of the ground layer 13 away from the radiation layer 12, the outer conductor 20*b* is connected with the ground layer 13, and the inner conductor 20*a* passes through the dielectric substrate 10 to be connected with the radiation layer 12. In this example, an orthographic projection of the coaxial conductive post 20 on the dielectric substrate 10 is located at the central axis OO'. The orthographic projection of the coaxial conductive post 20 on the dielectric substrate 10 is located at a side of the central axis QQ'. In this example, the radiation layer is fed by coaxial feeding manner.

In some exemplary implementations, the radiation layer 12 and the ground layer 13 may be formed on the dielectric substrate 10 through a circuit board manufacturing process. For example, the materials of the radiation layer 12 and the ground layer 13 may be metal (Cu) or silver (Ag). However, this embodiment is not limited thereto.

Figure 1C:
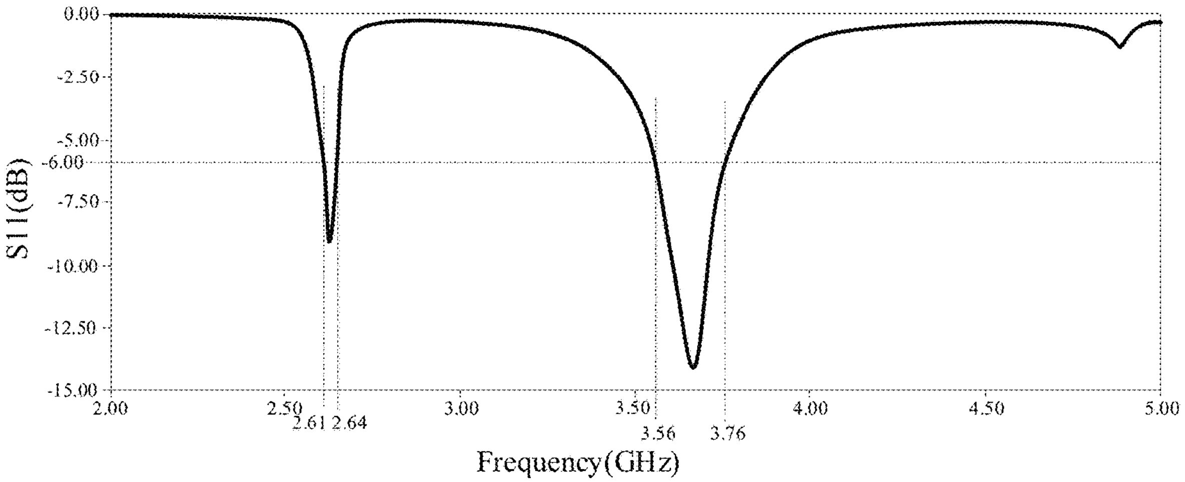
FIG. 1C is a schematic diagram of a simulation result of a S11 curve of an antenna structure shown in FIG. 1A.
Figure 1D:
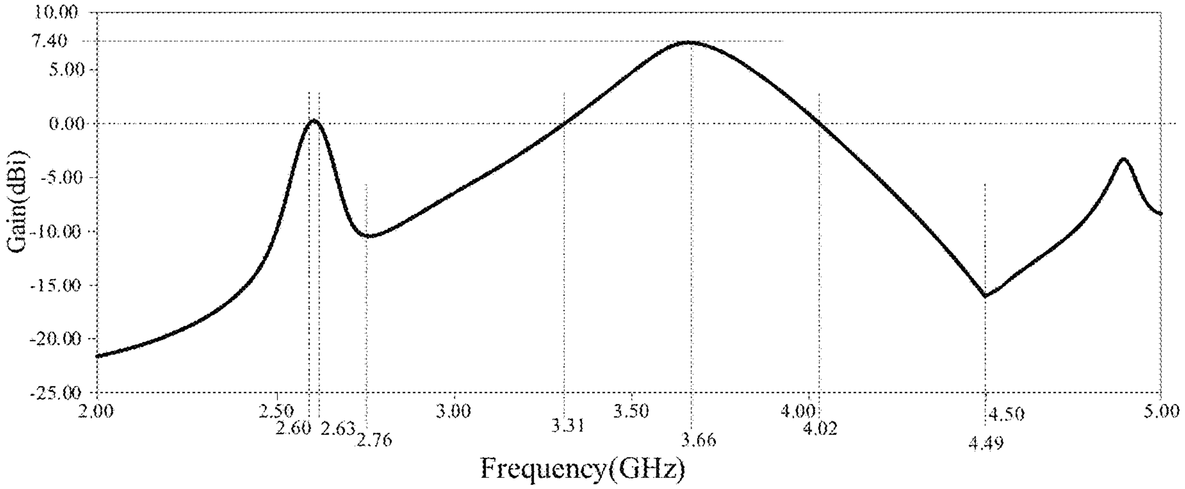
FIG. 1D is a schematic diagram of a simulation result of a gain curve of an antenna structure shown in FIG. 1A.

FIG. 1C is a schematic diagram of a simulation result of a S11 curve of an antenna structure shown in FIG. 1A. FIG. 1D is a schematic diagram of a simulation result of a gain curve of an antenna structure shown in FIG. 1A. In the present disclosure, a plane size is expressed as a first length*a second length, the first length is a length along the first direction D1, and the second length is a length along the second direction D2. A thickness is a length in a direction perpendicular to a plane where the first direction D1 and the second direction D2 are located.

In some exemplary implementations, a dielectric constant dk/a dielectric loss df of the dielectric substrate 10 is about 3.6/0.003, and a thickness of the dielectric substrate 10 is about 1.5 mm. A thickness of the radiation layer 12 and the ground layer 13 may be about 17 microns and the material of them may be metal (Cu). A center frequency $f_0$ of a simulated antenna is about 3 GHz, and a corresponding vacuum wavelength is $\lambda_0$. An overall thickness of the antenna is about $0.015\lambda_0$.

In some exemplary implementations, as shown in FIG. 1A, a plane size of the dielectric substrate 10 is about 55 mm*35 mm. A plane size of the radiation layer 12 is about 51 mm*20 mm. A plane size of the two second gaps 121*a* and 121*b* of the radiation layer 12 is about 0.2 mm*20 mm, and a distance between centers of the two second gaps 121*a* and 121*b* in the first direction D1 is about 3.2 mm. A plane size of the ground layer 13 is about 55 mm*35 mm. A plane size of the two first gaps 131*a* and 131*b* of the ground layer 13 is about 0.3 mm*22.0 mm, and a distance of centers of the two first gaps 131*a* and 131*b* in the first direction D1 is about 22.5 mm. A radius of the first short-circuit post 141*a* and a radius of the second short-circuit post 141*b* are both about 0.6 mm, a vertical distance between a center of the first short-circuit post 141*a* and a side edge of the first gap 131*a* close to the first short-circuit post 141*a* is about 0.95 mm, and a vertical distance between a center of the second short-circuit post 141*b* and a side edge of the first gap 131*b* close to the first short-circuit post 141*b* is about 0.95 mm. A radius of the coaxial conductive post 20 is about 1.4 mm, and a radius of the inner conductor 20*a* is about 0.6 mm. A center of the coaxial conductive post 20 is located at the central axis OO'.

In some exemplary implementations, as shown in FIG. 1C, an impedance bandwidth of the antenna structure at −6 dB is about 3.56 GHz to 3.76 GHz. As shown in FIG. 1D, a gain bandwidth of the antenna structure at 0 dBi is about 3.31 GHz to 4.02 GHz, in which a maximum gain is about 7.4 dBi, a corresponding resonant frequency point is about 3.66 GHz, the radiation zeros at high and low frequency are 4.49 GHz and 2.76 GHz respectively, and the out-of-band suppressions at high and low frequency are −23 dBi and −19 dBi respectively.

Figure 1E:
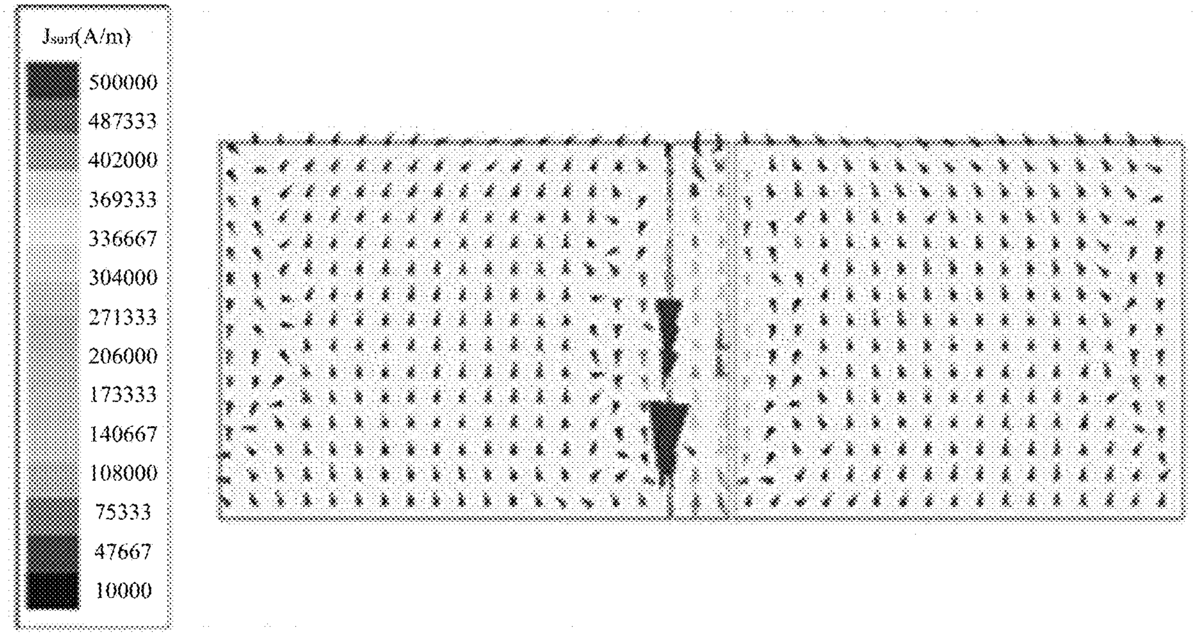
FIG. 1E(a) to FIG. 1E(c) are surface current vector distribution diagrams of a radiation layer of an antenna structure shown in FIG. 1A.
Figure 1E:
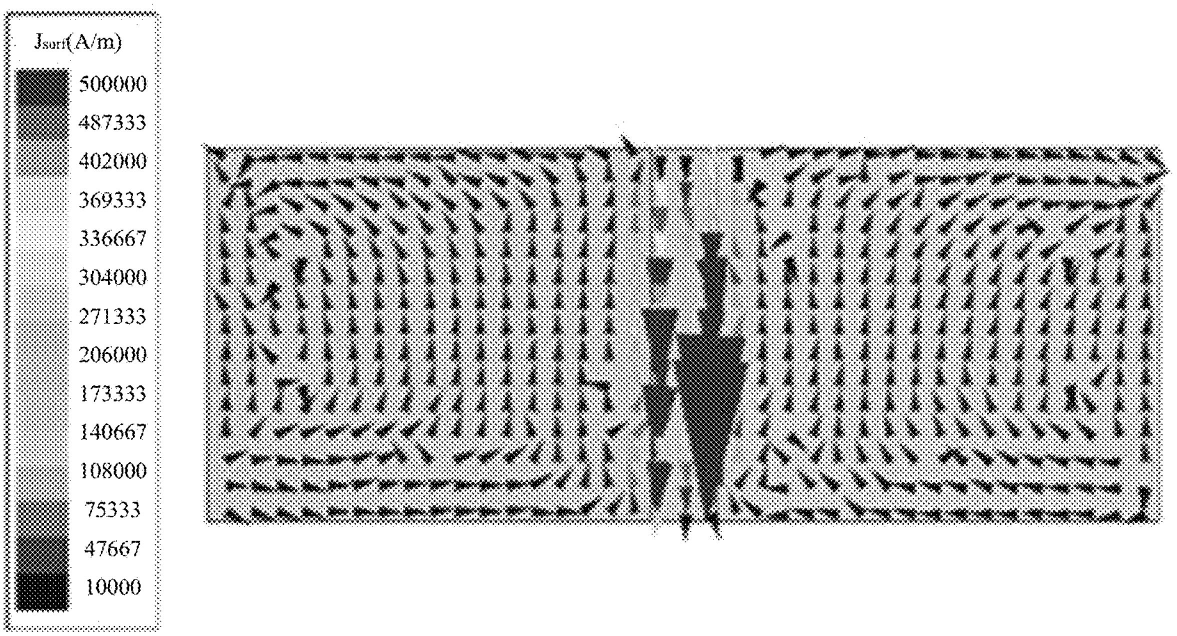
Figure 1E:
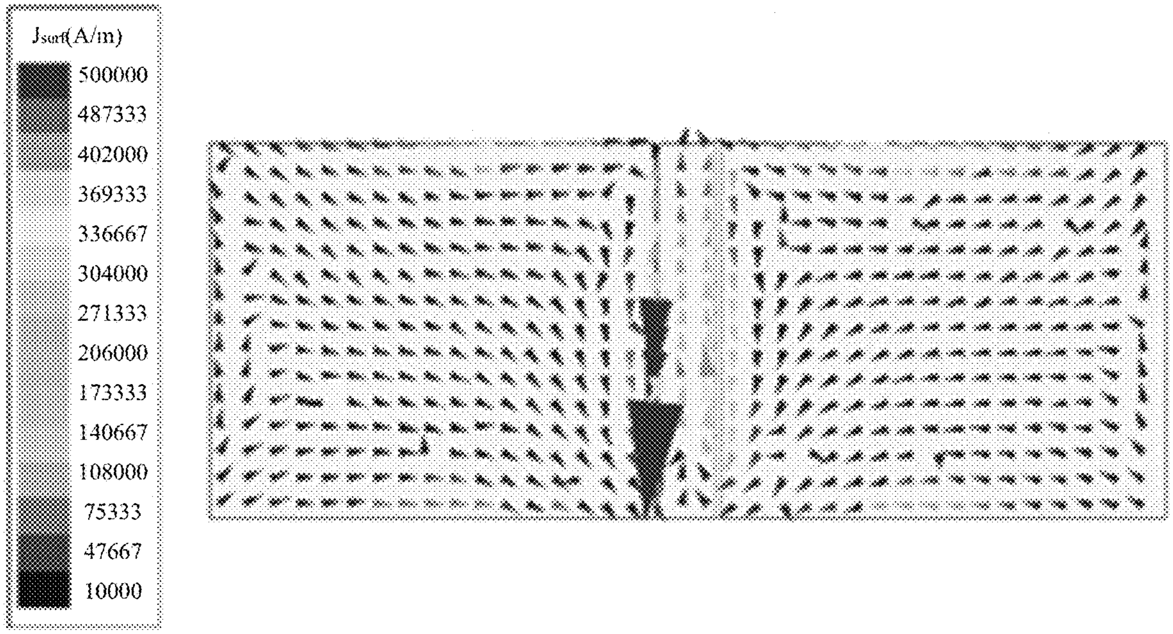

FIG. 1E(a) to FIG. 1E(c) are surface current vector distribution diagrams of a radiation layer of an antenna structure shown in FIG. 1A. FIG. 1E(a) is a surface current vector distribution diagram of an antenna structure shown in FIG. 1A at a gain peak point, and a corresponding frequency point is about 3.66 GHz; FIG. 1E(b) is a surface current vector distribution diagram of an antenna structure shown in FIG. 1A at a radiation zero at low frequency, and a corresponding frequency point is about 2.76 GHz; FIG. 1E(c) is a surface current vector distribution diagram of an antenna structure shown in FIG. 1A at a radiation zero at high frequency, and a corresponding frequency point is about 4.49 GHz. As may be seen from FIG. 1E(a) to FIG. 1E(c), at 2.76 GHz, surface currents on two sides of the radiation layer of the antenna structure have opposite directions and cancel each other to form the radiation zero at low frequency.

Figure 1F:
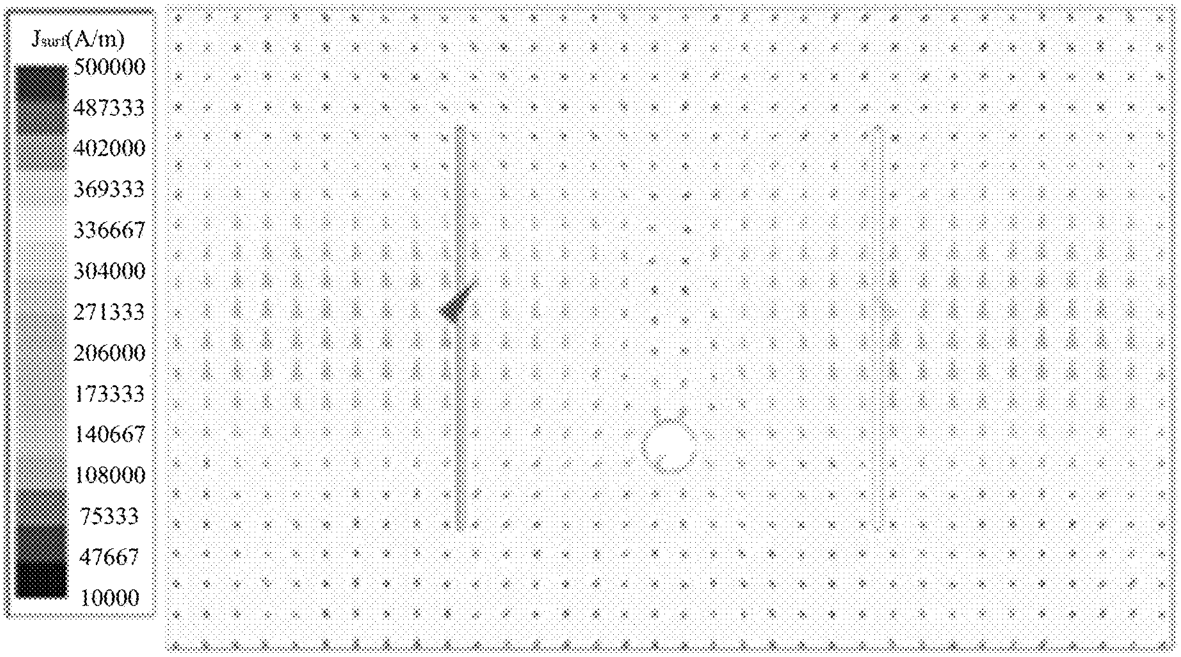
FIG. 1F(a) to FIG. 1F(c) are surface current vector distribution diagrams of a ground layer of an antenna structure shown in FIG. 1A.
Figure 1F:
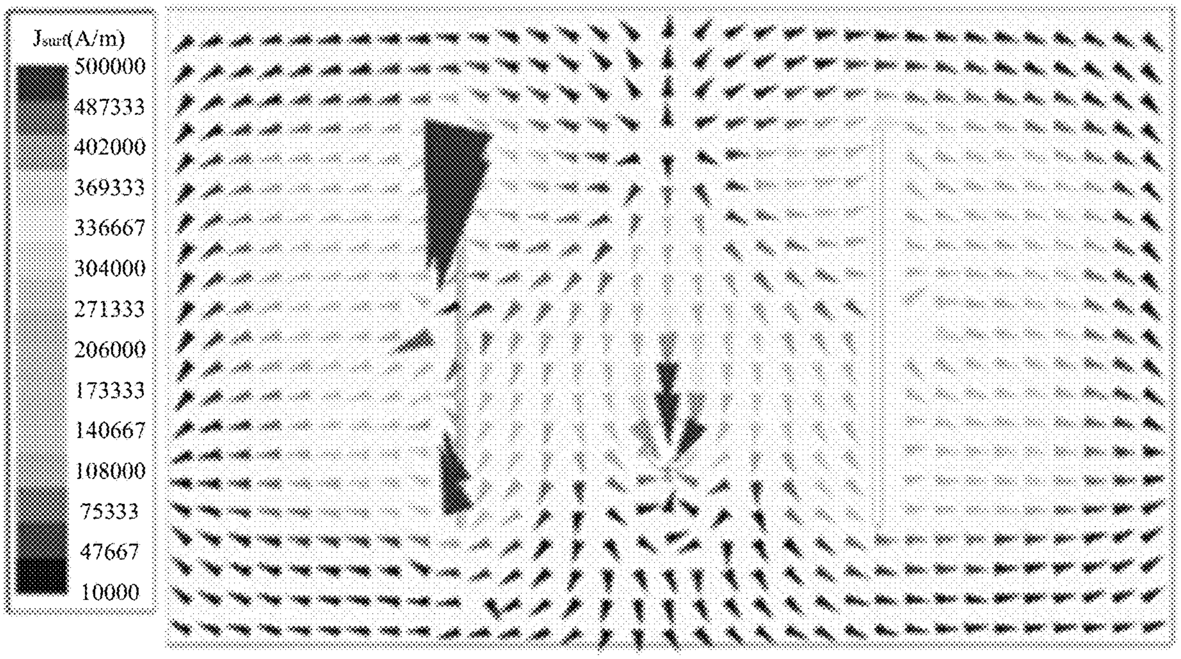
Figure 1F:
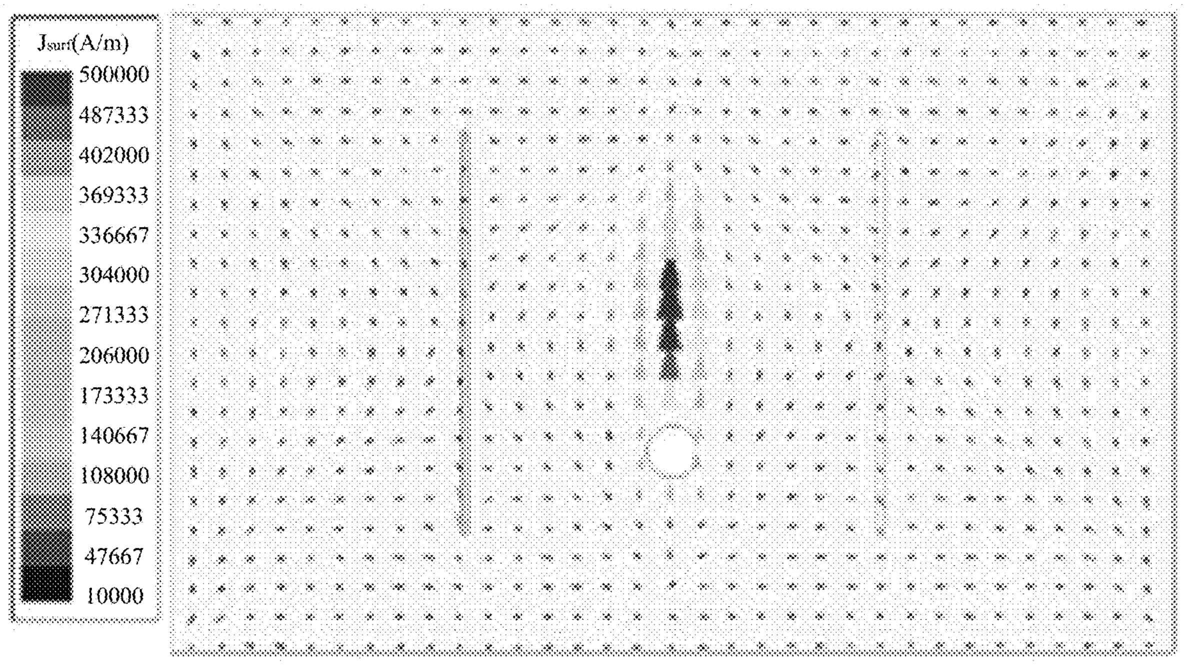

FIG. 1F(a) to FIG. 1F(c) are surface current vector distribution diagrams of a ground layer of an antenna structure shown in FIG. 1A. FIG. 1F(a) is a surface current vector distribution diagram of an antenna structure shown in FIG. 1A at a gain peak point, and a corresponding frequency point is about 3.66 GHz; FIG. 1F(b) is a surface current vector distribution diagram of an antenna structure shown in FIG. 1A at a radiation zero at low frequency, and a corresponding frequency point is about 2.76 GHz; FIG. 1F(c) is a surface current vector distribution diagram of an antenna structure shown in FIG. 1A at a radiation zero at high frequency, and a corresponding frequency point is about 4.49 GHz. As may be seen from FIG. 1F(a) to FIG. 1F(c), at 4.49 GHz, surface currents on two sides of the ground layer of the antenna structure have opposite directions and cancel each other to form the radiation zero at high frequency.

In this exemplary embodiment, the gain bandwidth of the antenna structure at 0 dBi may completely cover a n78 frequency band, and the antenna has a good overall out-of-band suppression characteristic and a low profile, which may meet requirements of a mobile terminal device for a thin and light antenna.

Figure 2A:
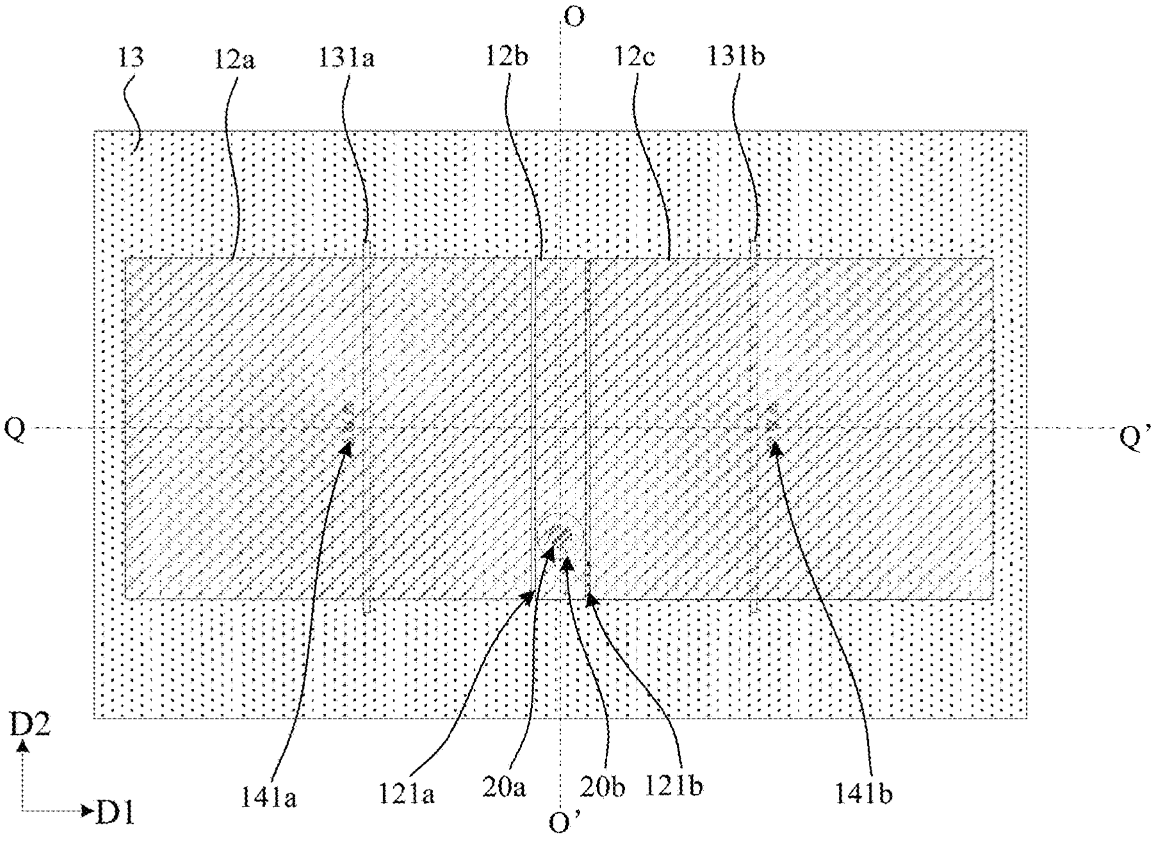
FIG. 2A is another schematic plan view of an antenna structure according to at least one embodiment of the present disclosure.
Figure 2B:
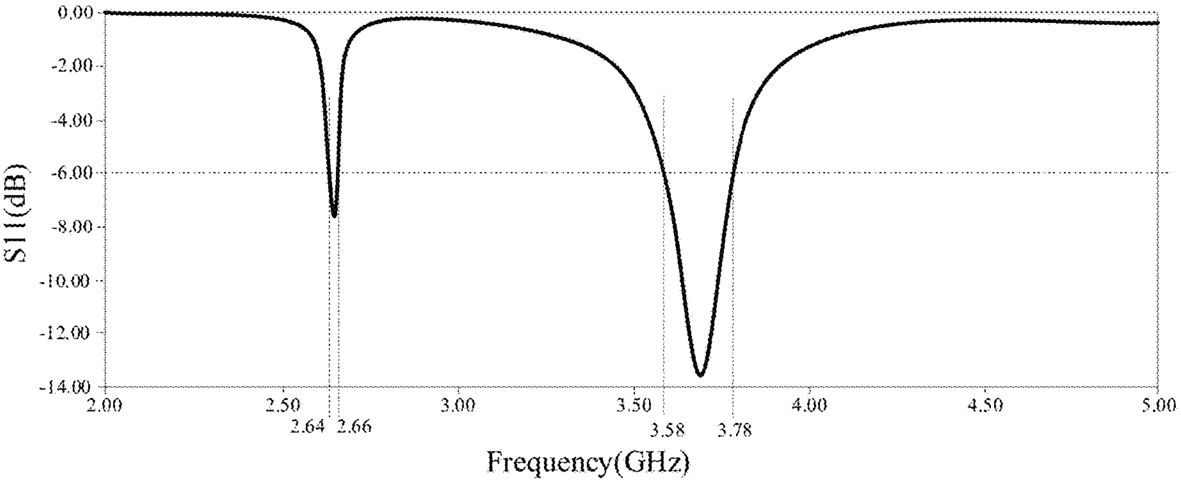
FIG. 2B is a schematic diagram of a simulation result of a S11 curve of an antenna structure shown in FIG. 2A.

FIG. 2A is another schematic plan view of an antenna structure according to at least one embodiment of the present disclosure. FIG. 2B is a schematic diagram of a simulation result of a S11 curve of an antenna structure shown in FIG.

Figure 2C:
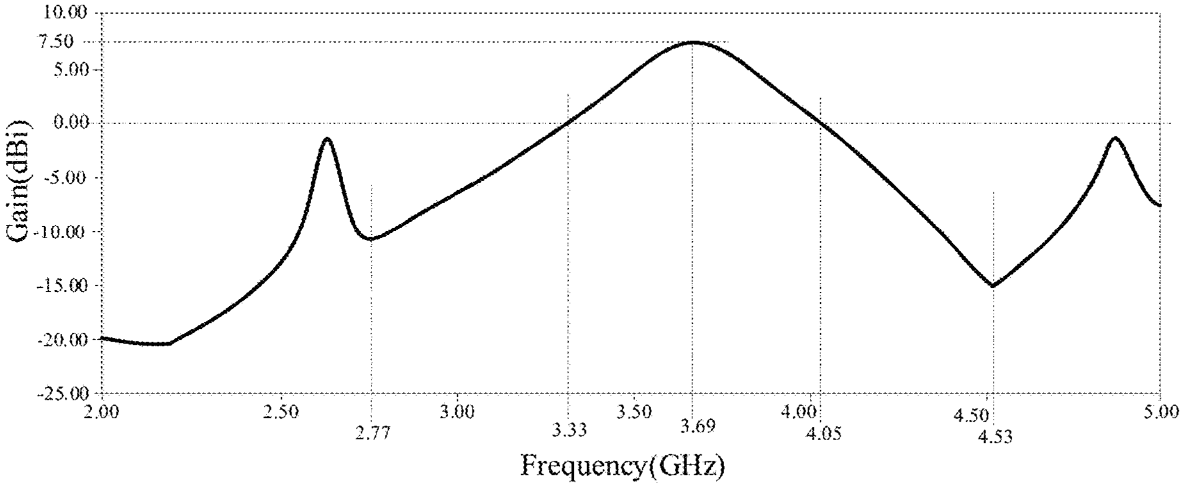
FIG. 2C is a schematic diagram of a simulation result of a gain curve of an antenna structure shown in FIG. 2A.

2A. FIG. 2C is a schematic diagram of a simulation result of a gain curve of an antenna structure shown in FIG. 2A.

In some exemplary implementations, as shown in FIG. 2A, the quantity of the first short-circuit posts 141*a* and the quantity of the second short-circuit posts 141*b* are both three. Three first short-circuit posts 141*a* are sequentially arranged along the second direction D2, and three second short-circuit posts 141*b* are sequentially arranged along the second direction D2. The three first short-circuit posts 141*a* and the three second short-circuit posts 141*b* have the same size. Three first short-circuit posts 141*a* and three second short-circuit posts 141*b* are symmetrical about the central axis OO', three first short-circuit posts 141*a* are symmetrical about the central axis QQ', and three second short-circuit posts 141*b* are symmetrical about the central axis OO'. In some examples, a radius of the first short-circuit posts 141*a* is about 0.2 mm, and a distance between centers of adjacent first short-circuit posts is about 1.0 mm to 3.0 mm, for example, 1.0 mm. A vertical distance between a center of the first short-circuit post 141*a* and a side edge of the first gap 131*a* close to the first short-circuit post 141*a* is about 0.5 mm to 2.4 mm, for example, 0.5 mm. This example is not limited to the quantity of the first short-circuit posts and the quantity of the second short-circuit posts. Other structures and parameters of the antenna structure of this embodiment may refer to the description of the antenna structure shown in FIG. 1A, so will not be repeated here.

In some exemplary implementations, as shown in FIG. 2B, an impedance bandwidth of the antenna structure at −6 dB is about 3.58 GHz to 3.78 GHz. As shown in FIG. 2C, a gain bandwidth of the antenna structure at 0 dBi is about 3.33 GHz to 4.05 GHz, in which a maximum gain is about 7.5 dBi, a corresponding resonant frequency point is about 3.69 GHz, radiation zeros at high and low frequency are 4.53 GHz and 2.77 GHz respectively, and out-of-band suppressions at high and low frequency are −25 dBi and −18 dBi respectively. In this exemplary embodiment, the gain bandwidth of the antenna structure at 0 dBi completely covers the n78 frequency band, and the antenna has a good overall out-of-band suppression characteristic and a low profile, which may meet requirements of a mobile terminal device for a thin and light antenna.

Figure 3A:
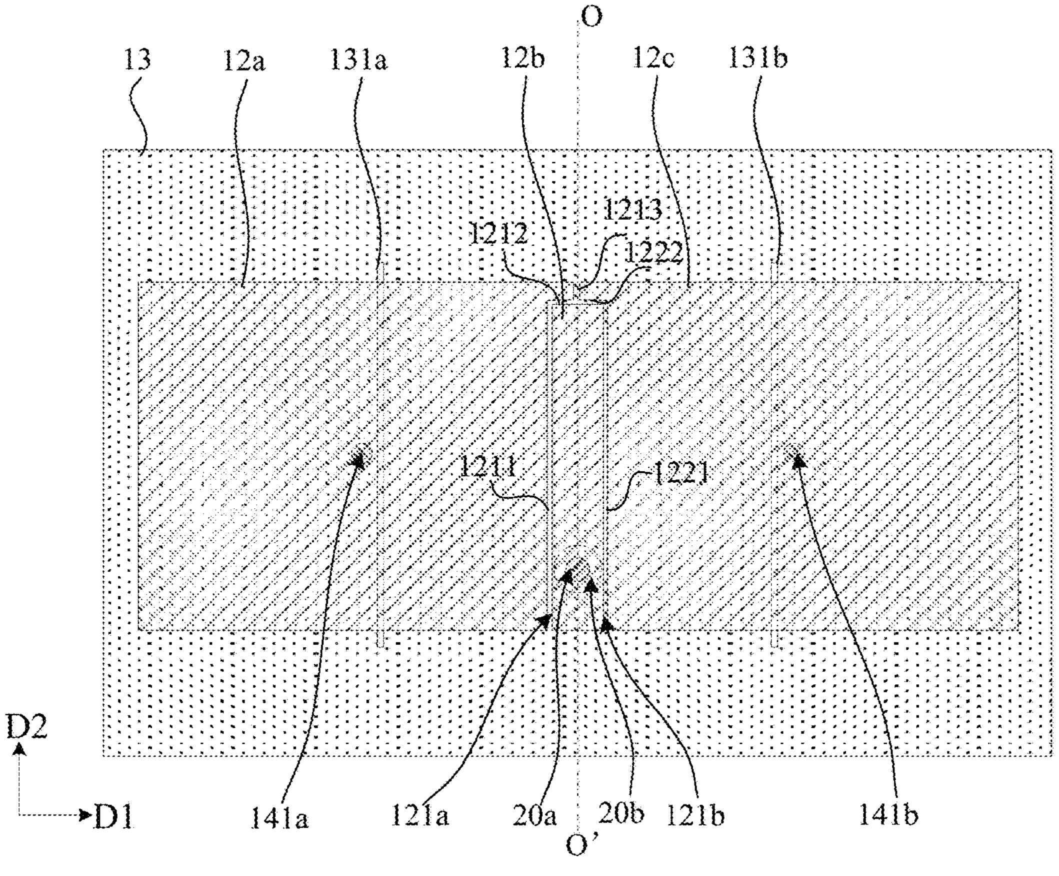
FIG. 3A is another schematic plan view of an antenna structure according to at least one embodiment of the present disclosure.
Figure 3B:
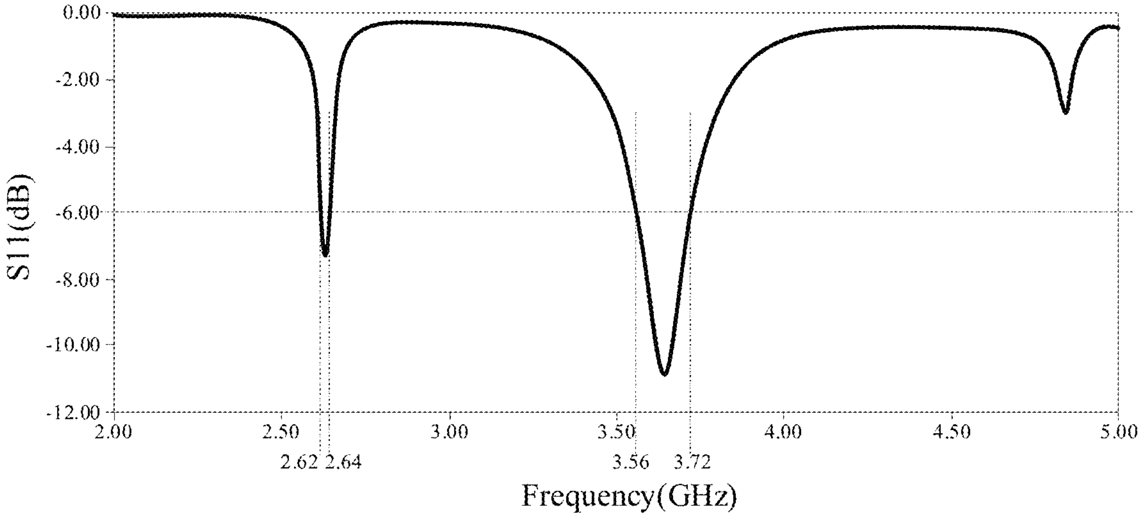
FIG. 3B is a schematic diagram of a simulation result of a S11 curve of an antenna structure shown in FIG. 3A.
Figure 3C:
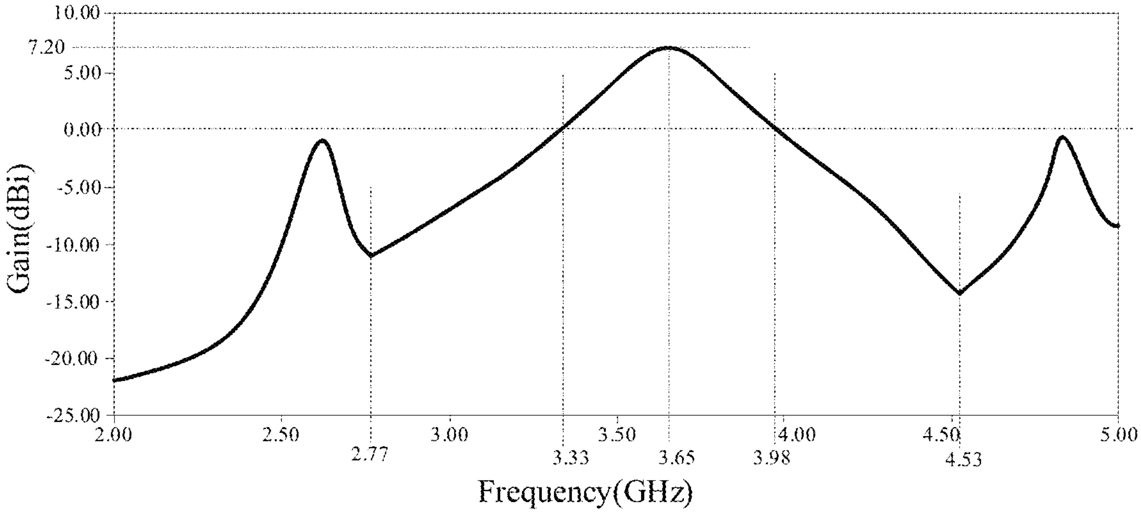
FIG. 3C is a schematic diagram of a simulation result of a gain curve of an antenna structure shown in FIG. 3A.

FIG. 3A is another schematic plan view of an antenna structure according to at least one embodiment of the present disclosure. FIG. 3B is a schematic diagram of a simulation result of a S11 curve of an antenna structure shown in FIG. 3A. FIG. 3C is a schematic diagram of a simulation result of a gain curve of an antenna structure shown in FIG. 3A.

In some exemplary implementations, as shown in FIG. 3A, in a second direction D2, first ends of two second gaps 121*a* and 121*b* of a radiation layer 12 communicate with each other and are flush with edges of the radiation layer 12, and the first ends are away from a coaxial conductive post. The second gap 121*a* of the radiation layer 12 includes a first extension part 1211, a second extension part 1212 and a third extension part 1213 which are connected sequentially. The second gap 121*b* includes a first extension part 1221, a second extension part 1222 and a third extension part 1213 which are connected sequentially. The first extension part 1211 of the second gap 121*a* and the first extension part 1221 of the second gap 121*b* are symmetrical about a central axis OO', the second extension part 1212 of the second gap 121*a* and the second extension part 1222 of the second gap 121*b* are symmetrical about the central axis OO', and the second gap 121*a* and the third extension part 1213 of the second gap 121*b* are overlapped and are located at the central axis OO'. The first extension part 1211 and the first extension part 1221 extend in the second direction D2, the second extension part 1212 and the second extension part 1222 extend in a first direction D1, and the third extension part 1213 extends in the second direction D2. In this example, the two second gaps 121*a* and 121*b* are in an inverted Y shape after communicating with each other. In some examples, a plane size of the first extension part 1211 and first extension part 1221 is about 0.2 mm*19.0 mm, a plane size of the second extension part 1212 and second extension part 1222 is about 1.60 mm*0.2 mm, and a plane size of the third extension part 1213 is about 0.2 mm*1.0 mm. Other structures and parameters of the antenna structure of this embodiment may refer to the description of the antenna structure shown in FIG. 1A, so will not be repeated here.

In some exemplary implementations, as shown in FIG. 3B, an impedance bandwidth of the antenna structure at −6 dB is about 3.56 GHz to 3.72 GHz. As shown in FIG. 3C, a gain bandwidth of the antenna structure at 0 dBi is about 3.33 GHz to 3.98 GHz, in which a maximum gain is about 7.2 dBi, a corresponding resonant frequency point is about 3.65 GHz, radiation zeros at high and low frequency are 4.53 GHz and 2.77 GHz respectively, and out-of-band suppressions at high and low frequency are −21 dBi and −18 dBi respectively. In this exemplary embodiment, the gain bandwidth of the antenna structure at 0 dBi completely covers the n78 frequency band, and the antenna has a good overall out-of-band suppression characteristic and a low profile, which may meet requirements of a mobile terminal device for a thin and light antenna. In this example, a second length of the first extension part is between 16 mm and 19 mm, which has no obvious influence on antenna performance.

Figure 4A:
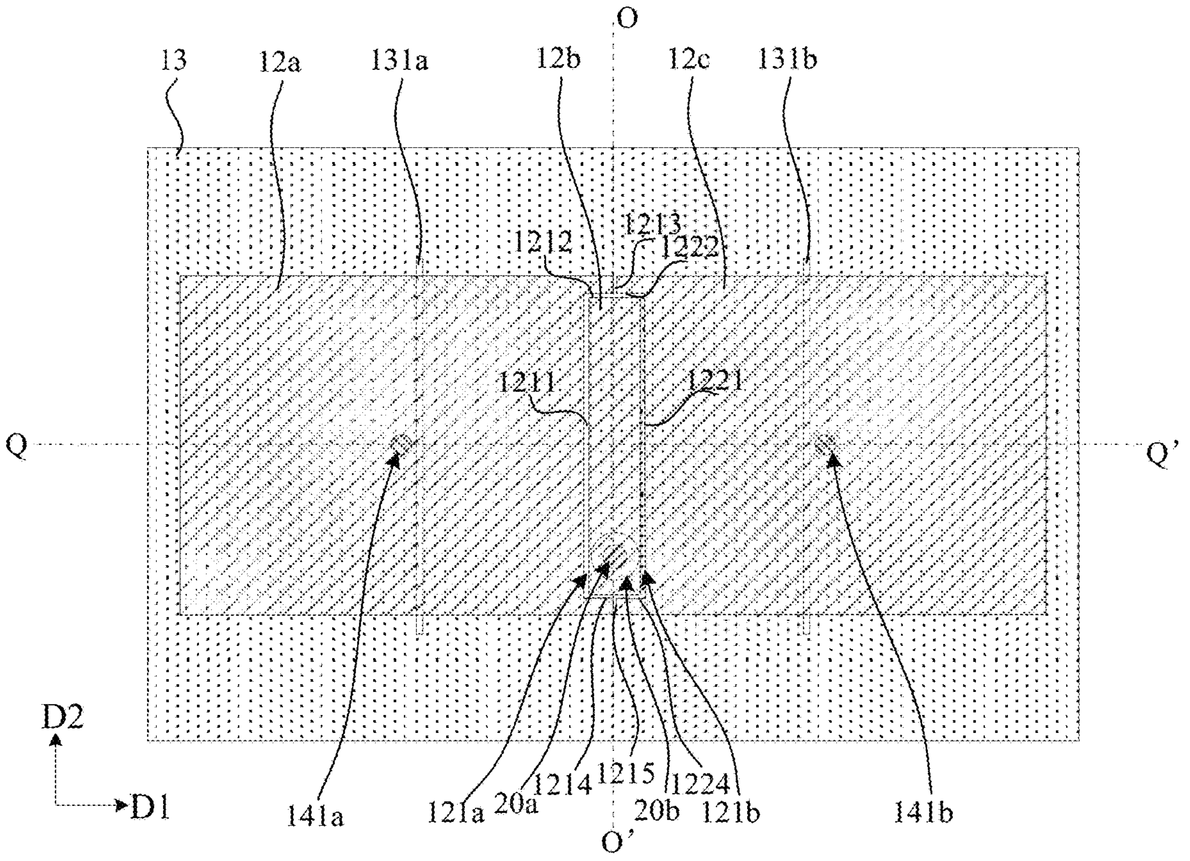
FIG. 4A is another schematic plan view of an antenna structure according to at least one embodiment of the present disclosure.
Figure 4B:
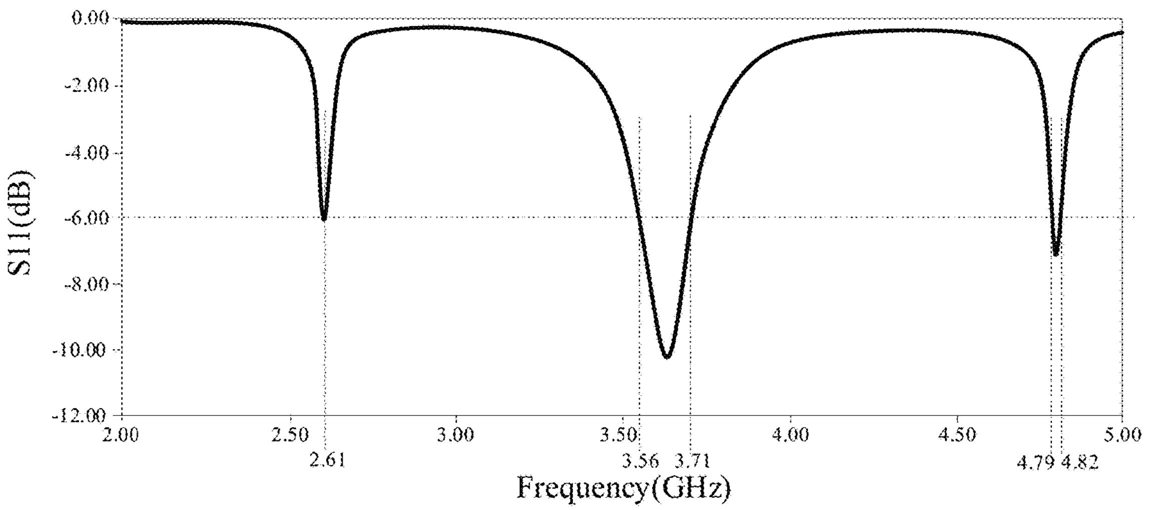
FIG. 4B is a schematic diagram of a simulation result of a S11 curve of an antenna structure shown in FIG. 4A.
Figure 4C:
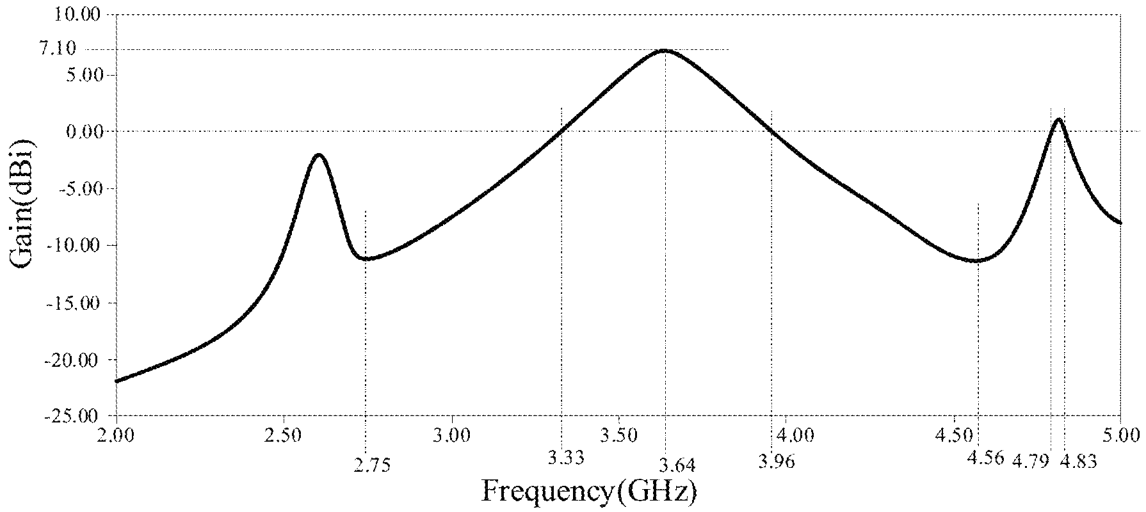
FIG. 4C is a schematic diagram of a simulation result of a gain curve of an antenna structure shown in FIG. 4A.

FIG. 4A is another schematic diagram of an antenna structure according to at least one embodiment of the present disclosure. FIG. 4B is a schematic diagram of a simulation result of a S11 curve of an antenna structure shown in FIG. 4A. FIG. 4C is a schematic diagram of a simulation result of a gain curve of an antenna structure shown in FIG. 4A.

In some exemplary implementations, as shown in FIG. 4A, in a second direction D2, first ends of two second gaps 121*a* and 121*b* of a radiation layer 12 communicate with each other, and the second ends also communicate with each other, and the first ends and the second ends are both flush with edges of the radiation layer 12. The second gaps 121*a* and 121*b* are symmetrical about the central axis OO'. The second gap 121*a* includes a third extension part 1213, a second extension part 1212, a first extension part 1211, a fourth extension part 1214 and a fifth extension part 1215 which are connected sequentially. The second gap 121*b* includes a third extension part 1213, a second extension part 1222, a first extension part 1221, a fourth extension part 1224 and a fifth extension part 1215 which are connected sequentially. The third extension parts 1213 of the two second gaps 121*a* and 121*b* are overlapped and are located at the central axis OO', and the fifth extension parts 1215 of the two second gaps 121*a* and 121*b* are overlapped and are located at the central axis OO'. The first extension part 1211 of the first gap 121*a* and the first extension part 1221 of the second gap 121*b* are symmetrical about the central axis OO', the second extension part 1212 of the first gap 121*a* and the second extension part 1222 of the second gap 121*b* are symmetrical about the central axis OO', and the fourth extension part 1214 of the first gap 121*a* and the fourth extension part 1224 of the second gap 121*b* are symmetrical about the central axis OO'. The first extension part 1211 and first extension part 1221 extend in the second direction D2, the second extension part 1212 and second extension part

1222, the fourth extension part 1214 and fourth extension part 1224 extend in a first direction D1, and the third extension part 1213 and the fifth extension part 1215 extend in the second direction D2. In some examples, a plane size of the first extension part 1211 and the first extension part 1221 is about 0.2 mm*18.0 mm; a plane size of the second extension part 1212, the second extension part 1222, the fourth extension part 1214 and fourth extension part 1224 are about 0.2 mm*1.6 mm; and a plane size of the third extension part 1213 and the fifth extension part 1215 are about 0.2 mm*1.0 mm. Other structures and parameters of the antenna structure of this embodiment may refer to the description of the antenna structure shown in FIG. 1A, so will not be repeated here.

In some exemplary implementations, as shown in FIG. 4B, an impedance bandwidth of the antenna structure at −6 dB is about 3.56 GHz to 3.71 GHz. As shown in FIG. 4C, a gain bandwidth of the antenna structure at 0 dBi is about 3.33 GHz to 3.96 GHz, in which a maximum gain is about 7.10 dBi, a corresponding resonant frequency point is about 3.64 GHz, radiation zeros at high and low frequency are 4.56 GHz and 2.75 GHz respectively, and out-of-band suppressions of high and low frequency are −21 dBi and −18 dBi respectively. In this exemplary embodiment, the gain bandwidth of the antenna structure at 0 dBi completely covers the n78 frequency band, and the antenna has a good overall out-of-band suppression characteristic and a low profile, which may meet requirements of a mobile terminal device for a thin and light antenna. In this example, a second length of the first extension part is between 16 mm and 19 mm, which has no obvious influence on the antenna performance.

The antenna structure according to this exemplary embodiment has advantages of simple structure and low profile, and the surface current distribution of the radiation layer and the ground layer is changed through the plane structure design, so as to achieving the filtering function.

Figure 5:
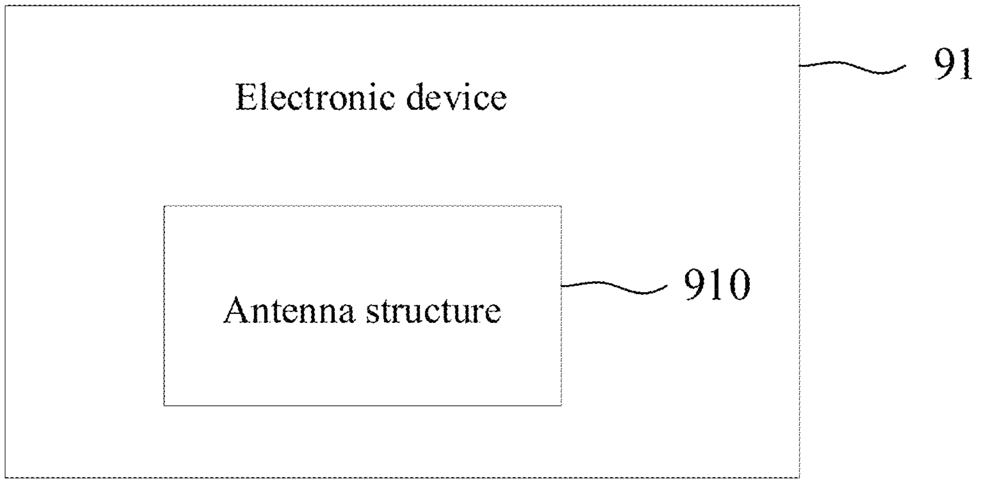
FIG. 5 is a schematic diagram of an electronic device according to at least one embodiment of the present disclosure.

FIG. 5 is a schematic diagram of an electronic device according to at least one embodiment of the present disclosure. As shown in FIG. 5, this embodiment provides an electronic device 91, which includes an antenna structure 910. The electronic device 91 may be any product or component with communication functions such as a smart phone, a navigation device, a game machine, a television (TV), a car audio, a tablet computer, a Personal Multimedia Player (PMP), a Personal Digital Assistant (PDA), etc. However, this present embodiment is not limited thereto.

The drawings of the present disclosure only involve the structures involved in the present disclosure, and the other structures may refer to conventional designs. If there are no conflicts, the embodiments in the present disclosure, and the features in the embodiments, can be combined to obtain new embodiments.

Those of ordinary skill in the art should know that modifications or equivalent replacements may be made to the technical solutions of the present disclosure without departing from the spirit and scope of the technical solutions of the present disclosure, and shall all fall within the scope of the claims of the present disclosure.

The invention claimed is:

1. An antenna structure, comprising:

a dielectric substrate, a ground layer and a radiation layer located at two opposite sides of the dielectric substrate, wherein the ground layer has two first gaps which are symmetrical about a central axis of the antenna structure in a first direction to introduce a radiation zero, and the radiation layer has two second gaps which are symmetrical about the central axis, edges of the two second gaps are aligned with edges of the radiation layer in a second direction to introduce another radiation zero; and the second direction is perpendicular to the first direction.

2. The antenna structure according to claim 1, wherein orthographic projections of the second gaps on the dielectric substrate are located at a side of orthographic projections of the first gaps on the dielectric substrate close to the central axis.

3. The antenna structure according to claim 1, wherein the two first gaps and the two second gaps extend along the second direction, and a length of the first gaps along the second direction is longer than a length of the second gaps along the second direction.

4. The antenna structure according to claim 1, further comprising at least one first short-circuit post and at least one second short-circuit post, wherein the first short-circuit post and the second short-circuit post connect the ground layer and the radiation layer;

the first short-circuit post and the second short-circuit post are symmetrical about the central axis; and orthographic projections of the first short-circuit post and the second short-circuit post on the dielectric substrate are located at a side of the orthographic projections of the first gaps on the dielectric substrate away from the central axis.

5. The antenna structure according to claim 4, wherein the quantity of the first short-circuit post and the quantity of the second short-circuit post are both three.

6. The antenna structure according to claim 1, wherein the ground layer is connected with an outer conductor of a coaxial conductive post, and the radiation layer is connected with an inner conductor of the coaxial conductive post; and an orthographic projection of the coaxial conductive post on the dielectric substrate is located between the orthographic projections of the two second gaps on the dielectric substrate.

7. The antenna structure according to claim 6, wherein, the coaxial conductive post is connected with a radio frequency connector, and the radio frequency connector is located at a side of the ground layer away from the dielectric substrate.

8. The antenna structure according to claim 1, wherein in the second direction, first ends of the two second gaps communicate with each other and are flush with the edges of the radiation layer.

9. The antenna structure according to claim 1 wherein in the second direction, first ends of the two second gaps communicate with each other and are flush with the edges of the radiation layer, and second ends of the two second gaps communicate with each other and are flush with the edges of the radiation layer; the first ends and the second ends are located at two opposite sides of the central axis of the antenna structure in the second direction.

10. An electronic device, comprising the antenna structure according to claim 1.

* * * * *